United States Patent
Fukuoka et al.

[11] Patent Number: 5,817,285
[45] Date of Patent: Oct. 6, 1998

[54] CONTINUOUS PREPARATION OF SILICON NITRIDE POWDER

[75] Inventors: Hirofumi Fukuoka; Yoshiharu Konya; Masanori Fukuhira, all of Annaka, Japan

[73] Assignee: Shin-Etsu Chemical Co., Ltd., Tokyo, Japan

[21] Appl. No.: 759,378

[22] Filed: Dec. 4, 1996

[30] Foreign Application Priority Data

Dec. 7, 1995 [JP] Japan .................................. 7-345247

[51] Int. Cl.$^6$ ............................................... C01B 21/068
[52] U.S. Cl. ............................................................. 423/344
[58] Field of Search .............................................. 423/344

[56] References Cited

U.S. PATENT DOCUMENTS

| | | | |
|---|---|---|---|
| 5,232,677 | 8/1993 | Fukuoka et al. | 423/344 |
| 5,344,634 | 9/1994 | Edler | 423/344 |
| 5,456,896 | 10/1995 | Fukuoka et al. | 423/344 |

*Primary Examiner*—Wayne Langel
*Attorney, Agent, or Firm*—McAulay Nissen Goldberg Kiel & Hand, LLP

[57] ABSTRACT

Silicon nitride powder is continuously prepared by feeding metallic silicon powder into a fluidized bed comprising silicon nitride powder and nitrogen or ammonia gas and discharging a nitrided product from the fluidized bed. The metallic silicon powder is pretreated at a temperature of 1,000°–1,400° C. under a vacuum of 0.001–100 Torr before it is subject to nitriding reaction.

3 Claims, 1 Drawing Sheet

CONTINUOUS PREPARATION OF SILICON NITRIDE POWDER

BACKGROUND OF THE INVENTION

1. Field of the Invention

This invention relates to a process for continuously preparing silicon nitride powder having a high alpha-type content at a high percent conversion.

2. Prior Art

One typical prior art process for continuously preparing silicon nitride powder is by direct nitriding through a fluidized bed. JP-B 6482/1994 by the same assignee as the present invention discloses a two-stage reaction process comprising the steps of continuously feeding a stock material to be nitrided containing metallic silicon powder into a first fluidized bed comprising silicon nitride powder and a non-oxidizing gas containing nitrogen gas or ammonia gas where primary nitriding reaction takes place and then feeding the product into a second fluidized bed comprising silicon nitride powder and a non-oxidizing gas containing nitrogen gas or ammonia gas where secondary nitriding reaction of nitriding the unreacted stock material takes place.

In this process, however, the stock material feed to be nitrided can pass shortcut since the fluidized bed is a fully mixed system. Then the residence time is short and the output is a silicon nitride powder containing a large amount of unreacted silicon. As a result, it is very difficult to produce silicon nitride powder at a conversion as high as 95% or more. In order that silicon nitride powder be produced at a high percent conversion by this continuous process, it is recommended (1) to extend the residence time, (2) to add an additional stage or stages, (3) to add a catalyst, and (4) to elevate the reaction temperature.

These countermeasures, however, raise problems. In the event of extending the residence time (1) or using multiple stages (2), the residence time through the production system is increased at the sacrifice of productivity. Where a catalyst is added (3), the nitride product can be contaminated with impurities. Where the reaction temperature is elevated (4), beta-type silicon nitride which is stable at elevated temperatures is produced in a higher proportion, resulting in a drop of sintered strength. From an operational aspect, silicon monoxide deposits on the inner wall of an output duct for discharging the nitride product. After long-term operation, the output duct is narrowed to such an extent that the product cannot be eventually discharged.

SUMMARY OF THE INVENTION

Therefore, an object of the present invention is to provide a process for continuously preparing high alpha-type silicon nitride powder at a high conversion within a short time in an efficient and commercially advantageous manner.

The present invention provides a process for continuously preparing high alpha-type silicon nitride powder by continuously feeding metallic silicon powder into a fluidized bed comprising silicon nitride powder and a non-oxidizing gas containing nitrogen gas or ammonia gas, and continuously discharging a nitrided product from the fluidized bed. According to the feature of the invention, the metallic silicon powder as a feed stock is pretreated at an elevated temperature under vacuum before it is subject to nitriding in the fluidized bed. Then silicon nitride powder having an alpha-type content of at least 90% can be produced at a conversion of at least 95% within a short time in an efficient manner.

Making investigations in search of a process capable of preparing high alpha-type silicon nitride powder having an alpha-type content of at least 90% at a conversion of at least 95% without lowering productivity while eliminating the drawback of the above-mentioned continuous two-stage fluidized bed system that reactivity lowers as a result of shortcut passage, we reached the conclusion that increasing a rate of reaction, especially at the initial of nitriding is effective. Thus we studied the reaction mechanism and made a series of experiments for accelerating the rate of reaction. We confirmed that even after a nitriding temperature is reached, reaction does not take place for a certain time (a delay in rise time) and that after the start of reaction, reaction proceeds with concomitant ablation or stripping of silicon nitride coating formed on the surface of metallic silicon (see Y. Inomata and Y. Uemura, YogyoKyokai-shi, 83, 244 (1975)). We got the forecast that the rate of reaction can be significantly increased by establishing the means or formulation for eliminating a delay in rise time and promoting the stripping of silicon nitride coating on the surface of metallic silicon. It is believed that the delay in rise time corresponds to the time taken to remove autoxidation film formed on the surface of metallic silicon, and the stripping of silicon nitride coating takes place under the impetus of differential thermal expansion between metallic silicon and silicon nitride and the vapor pressure of metallic silicon vapor or the like given off from the metallic silicon surface. Then the delay in rise time can be effectively eliminated by previously removing oxide coating on the metallic silicon surface. With respect to the promotion of stripping of silicon nitride coating, since the bond energy (812 kJ/mol) of Si—O is greater than the bond energy (320 kJ/mol) of Si—N by a factor of more than 2, the absence of oxygen allows for more smooth stripping of silicon nitride coating and hence, more brief production of silicon nitride powder at a higher percent conversion or nitridation. From the operational aspect, it was found that oxygen in stock material is involved in the following set of reactions:

$$Si+SiO_2 \rightarrow 2SiO$$

$$SiO_2+H_2 \rightarrow SiO+H_2O$$

$$SiO_2 \rightarrow SiO+\tfrac{1}{2}O_2$$

to form silicon monoxide gas which deposits on the inner wall of an output duct to narrow the output duct, obstructing long-term continuous operation. That is, from both the aspects of reaction and operation, oxygen present on the surface of metallic silicon stock material and taken into metallic silicon upon exposure to elevated temperatures has a deleterious influence. In order to attain the object of the invention, it is essential to establish a method of efficiently removing oxygen from metallic silicon. Making further investigations on the method of efficiently removing oxygen from metallic silicon, we have found that the oxygen content of metallic silicon powder stock material can be reduced by pretreating the stock material at an elevated temperature in vacuum. By continuously feeding the pretreated stock material into a fluidized bed comprising silicon nitride powder and a non-oxidizing gas containing nitrogen gas or ammonia gas, silicon nitride powder can be produced at a high percent conversion within a short time. Additionally, from the operational aspect, the reduced oxygen content of metallic silicon powder stock material suppresses the generation of silicon monoxide gas through the above-mentioned set of reactions to drastically reduce the deposition of silicon monoxide on the output duct inner wall, resulting in a significant improvement in operational stability.

Accordingly, the present invention provides a process for continuously preparing high alpha-type silicon nitride powder comprising the steps of pretreating metallic silicon powder at an elevated temperature under vacuum, continuously feeding the pretreated metallic silicon powder into a fluidized bed comprising silicon nitride powder and a non-oxidizing gas containing nitrogen gas or ammonia gas, and continuously discharging a nitrided product from the fluidized bed.

BRIEF DESCRIPTION OF THE DRAWINGS

These and further features of the present invention will be apparent with reference to the following description and drawings, wherein.

the only figure.

DETAILED DESCRIPTION OF THE INVENTION

Figure 1:
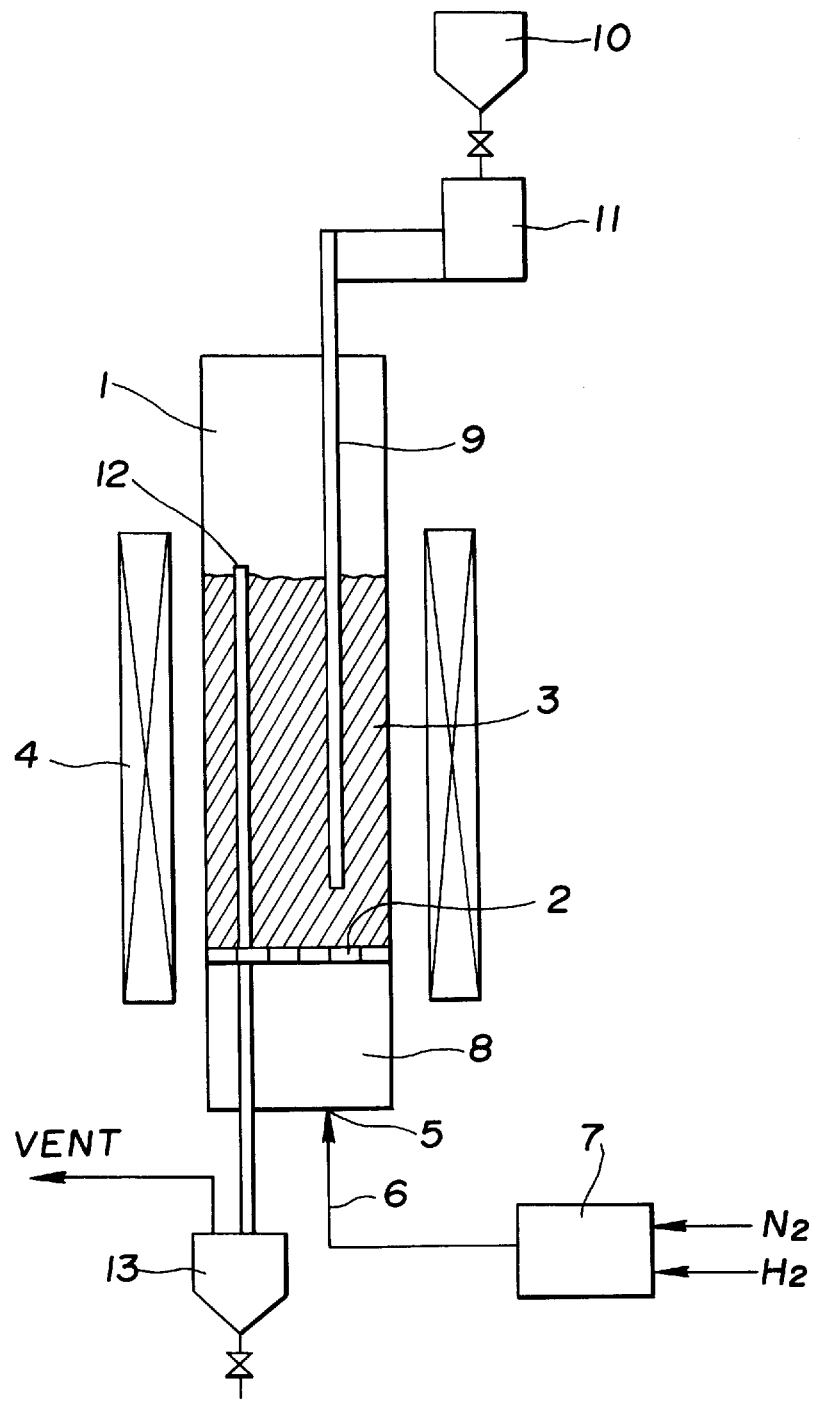
FIG. 1 is a schematic illustration of a silicon nitride producing system according to the invention.

The process of the present invention starts with metallic silicon powder as a stock material. Though not critical, it is preferred to use metallic silicon powder of 150 mesh under, preferably 325 mesh under as a stock material. Alternatively, metallic silicon powder is granulated and consolidated into particles having a mean particle size of 100 μm to 10 mm, especially 300 μm to 1 mm. Such granulation and consolidation may be carried out by adding a binder such as polyvinyl alcohol to metallic silicon powder, granulating the mixture into granules, and briefly firing the granules at a temperature of about 1,000° to 1,400° C. such that the silicon granules are joined to each other, but not fused. For promoting nitriding reaction, suitable additives such as K, Na, Cu, Li, V, Ca and Fe or compounds thereof may be added to metallic silicon powder.

According to the present invention, metallic silicon powder is pretreated at an elevated temperature under vacuum before it is subject to nitriding reaction. Where granulated and consolidated metallic silicon powder is used as a stock feed to be nitrided, metallic silicon powder may be pretreated at an elevated temperature in vacuum and then disintegrated to a size of 100 μm to 10 mm before use. Alternatively, untreated metallic silicon powder may be granulated and consolidated and then pretreated at an elevated temperature in vacuum before use. In one preferred embodiment, however, when metallic silicon powder is granulated and consolidated, the firing for consolidation is carried out at an elevated temperature in vacuum.

For the pretreatment, any desired equipment may be used. A batch furnace with least leakage is preferred. By means of a vacuum pump, the furnace is preferably evacuated to a vacuum of $10^{-3}$ to 100 Torr, especially $10^{-2}$ to 50 Torr. Pretreatment under a vacuum of higher than 100 Torr would be ineffective. Under a vacuum of lower than $10^{-3}$ Torr, no additional advantage would be obtained and metallic silicon can be lost through evaporation, resulting in a lower yield. The treating temperature is preferably 1,000° to 1,400° C., more preferably 1,200° to 1,350° C. Pretreatment at a temperature of lower than 1,000° C. would be ineffective whereas metallic silicon can be melted at a temperature of higher than 1,400° C., detracting from reactivity.

According to the present invention, the metallic silicon powder which has been pretreated at an elevated temperature under vacuum is continuously fed into a fluidized bed comprising silicon nitride powder and a non-oxidizing gas containing nitrogen gas or ammonia gas where nitriding reaction takes place. The resulting nitride product is continuously discharged from the fluidized bed. The reaction conditions of the fluidized bed may be well-known ones. More particularly, the fluidized bed may be set at a temperature of 1,000° to 1,500° C., preferably 1,200° to 1,400° C. At temperatures below 1,000° C., little nitride would form on the surface of metallic silicon particles. Temperatures above 1,500° C. can melt metallic silicon to impede reaction. The non-oxidizing gas serving to form the fluidized bed may contain 10 to 100% by volume, especially 60 to 90% by volume of nitrogen gas or ammonia gas. Optionally, the non-oxidizing gas contains hydrogen gas and an inert gas such as helium and argon.

In the practice of the invention, the nitriding reaction in the fluidized bed is preferably one-stage reaction although two- or multi-stage reaction is employable if desired.

Referring to FIG. 1, there is schematically illustrated an exemplary reaction system which is used in the practice of the invention. The system includes a reactor 1 in the form of a vertical cylindrical vessel. The reactor 1 is provided with a gas dispersing perforated plate 2 at a lower position, above which a fluidized bed 3 is formed and below which a reaction gas feed compartment 8 is defined. A heater 4 is disposed outside the reactor 1 so as to circumscribe a fluidized bed-forming region. The reactor 1 is provided at a lower end with a gas inlet 5 which is connected to a gas blender 7 through a gas feed conduit 6. The gas blender 7 receives nitrogen gas and hydrogen gas, for example, mixes them, and then supplies the gas mixture into the reaction gas feed compartment 8 through the gas feed conduit 6 and the gas inlet 5. The gas mixture is dispersed into the fluidized bed-forming region through apertures in the plate 2 to form the fluidized bed 3 with the silicon nitride powder which is previously introduced therein. A feed pipe 9 for feeding a stock material is tightly passed through the top of the reactor 1 and extended through the reactor 1 until the lower end of the feed pipe 9 reaches a lower portion of the fluidized bed 3. The feed pipe 9 at the upper end is connected to a screw feeder 11 which is, in turn, connected to a hopper 10. An output pipe 12 for discharging silicon nitride is also tightly passed through the bottom of the reactor 1 and extended through the reactor 1 until the upper end of the output pipe 12 reaches near the upper surface of the fluidized bed 3. The output pipe 12 at the lower end is connected to a silicon nitride collector 13. In operation, the hopper 10 receives metallic silicon powder stock which has been pretreated at an elevated temperature in vacuum and delivers it to the screw feeder 11. The stock material is then fed into the fluidized bed 3 at a lower position through the feed pipe 9. In the fluidized bed 3, the stock material is subject to nitriding reaction. The resulting silicon nitride powder is discharged into the output pipe 12 at the upper end of the fluidized bed 3 and collected in the collector 13.

EXAMPLE

Examples of the present invention are given below by way of illustration and not by way of limitation. All parts are by weight.

Examples 1–5 and Comparative Examples 1–4

Silicon nitride powder was continuously prepared using a continuous fluidized bed reactor system as shown in FIG. 1. The stock material used herein was prepared by adding 1% by weight as solids of polyvinyl alcohol to metallic silicon powder having a mean particle size of 4.5 μm, milling the mixture, granulating the mixture into granules having a mean particle size of 0.5 mm by means of a granulating extruder, and calcining them under the conditions shown in Table 1. The hopper 10 was charged with this stock material.

The reactor 1 having an inner diameter of 250 mm was charged with 25 kg of silicon nitride powder while a gas mixture consisting of 150 normalized liter/min. of nitrogen gas and 40 normalized liter/min. of hydrogen gas mixed in the gas blender 7 was introduced in the reaction gas feed compartment 8 from the gas inlet 5 and then dispersed into the center region of the reactor through the gas dispersing plate 2 to form the fluidized bed 3. The heater 4 is actuated to heat the fluidized bed 3 at 1,350° C. The stock material was introduced deeply into the fluidized bed 3 at a rate of 4 kg/hour through the feed pipe 9. Silicon nitride powder formed as a result of nitriding reaction in the fluidized bed was discharged into the output pipe 12 in an overflowing manner and recovered in the collector 13.

In this way, the fluidized bed reactor system was continuously operated for 200 hours. Using X-ray diffraction and analysis instruments, the silicon nitride powder recovered was measured for a percent conversion and alpha-type content. The weight of SiO deposited on the inner wall of the output pipe 12 was measured. The results are shown in Table 1.

TABLE 1

|     | Pretreatment | | Silicon nitride powder | | SiO |
| --- | --- | --- | --- | --- | --- |
|     | Temp. (°C.) | Vacuum (Torr) | Conversion (%) | α content (%) | deposit (g) |
| E1  | 1300 | $1 \times 10^{-1}$ | 97.6 | 93.5 | trace |
| E2  | 1300 | $1 \times 10^{-3}$ | 97.3 | 94.2 | trace |
| E3  | 1300 | 50 | 96.1 | 93.3 | trace |
| E4  | 1000 | $1 \times 10^{-1}$ | 95.5 | 92.3 | trace |
| E5  | 1400 | $1 \times 10^{-1}$ | 96.8 | 93.2 | trace |
| CE1 | 1300 | 1 atm. | 83.0 | 90.7 | 220.5 |
| CE2 | 1450 | $1 \times 10^{-1}$ | 45.3 | 95.2 | trace |
| CE3 | 900 | $1 \times 10^{-1}$ | 88.5 | 93.8 | 30.2 |
| CE4 | 1300 | 150 | 92.5 | 92.7 | 16.8 |

It has been described that by pretreating metallic silicon powder at an elevated temperature in vacuum, there is obtained highly reactive stock material. Using the pretreated stock material, continuous nitriding reaction in a fluidized bed can be carried out without a substantial drop of percent conversion which is otherwise caused by shortcut passage. Then the process is successful in producing silicon nitride powder at a high percent conversion within a short time and in an efficient stable manner without system trouble such as blockage of an output pipe.

Japanese Patent Application No. 345247/1995 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A process for continuously preparing high alphatype silicon nitride product comprising the steps of:

pretreating metallic silicon powder at 1000° to 1400° C. under $10^{-3}$ to 100 Torr to reduce the oxygen content of the metallic silicon powder before it is subject to a nitriding reaction, continuously feeding the pretreated metallic silicon powder into a fluidized bed comprising silicon nitride powder and a non-oxidizing gas containing nitrogen gas or ammonia gas, and continuously discharging a nitrided product from the fluidized bed.

2. The process of claim 1 further comprising the step of granulating the pretreated metallic silicon powder into granules having a mean particle size of 100 μm to 10 mm before it is fed into the fluidized bed.

3. A process for continuously preparing high alphatype silicon nitride product comprising the steps of:

granulating metallic silicon powder into granules having a mean particle size of 100 μm to 10 mm, pretreating the granules at 1000° to 1400° C. under $10^{-3}$ to 100 Torr to reduce the oxygen content of the granules before they are subject to a nitriding reaction, continuously feeding the granules into a fluidized bed comprising silicon nitride powder and a non-oxidizing gas containing nitrogen gas or ammonia gas, and continuously discharging a nitrided product from the fluidized bed.

* * * * *